United States Patent [19]
Yabe et al.

[11] Patent Number: 5,590,965
[45] Date of Patent: Jan. 7, 1997

[54] LINEAR GUIDE APPARATUS LUBRICATED WITH LUBRICANT-CONTAINING POLYMER

[75] Inventors: Toshikazu Yabe, Kanagawa; Soichiro Kato; Ken Mamimatsu, both of Gunma, all of Japan

[73] Assignee: NSK Ltd., Tokyo, Japan

[21] Appl. No.: 587,714

[22] Filed: Jan. 19, 1996

[30] Foreign Application Priority Data

Jan. 20, 1995 [JP] Japan ................................. 7-007312

[51] Int. Cl.$^6$ ................................................. F16C 29/06
[52] U.S. Cl. ................................................. 384/15; 384/45
[58] Field of Search ................................. 384/45, 43, 44, 384/15, 16; 464/168

[56] References Cited

U.S. PATENT DOCUMENTS

| | | | |
|---|---|---|---|
| 4,239,632 | 12/1980 | Baile | 252/12 |
| 4,929,095 | 5/1990 | Osawa | 384/45 |
| 5,308,166 | 5/1994 | Osawa | 384/45 |
| 5,492,412 | 2/1996 | Tsukada | 384/15 |
| 5,492,413 | 2/1996 | Ysukada | 384/15 |
| 5,494,354 | 2/1996 | Tsukada | 384/13 |

FOREIGN PATENT DOCUMENTS

| | | | |
|---|---|---|---|
| 6-346919 | 12/1994 | Japan | F16C 29/08 |
| 7-35146 | 2/1995 | Japan | F16C 33/76 |

*Primary Examiner*—Lenard A. Footland
*Attorney, Agent, or Firm*—Sughrue, Mion, Zinn, Macpeak & Seas

[57] ABSTRACT

In a linear guide apparatus including a guide rail, a slider and a plurality of rolling elements, the apparatus further includes a seal device fixed to the slider in slidable contact with an outer surface of the guide rail for sealing a clearance existing between the guide rail and the slider, the seal device including a reinforcement plate and a lubricant-containing polymer member, the reinforcement plate having a first surface fixed to the end face of the slider and a second surface which is formed of polyolefinic synthetic resin, the lubricant-containing polymer member being formed of a polyolefinic polymer and a lubricant, and joined to the second surface of the reinforcement plate by one-piece molding. The linear guide apparatus can supply automatically the lubricant from the seal device to the rolling elements in the slider consistently over an extended period of time while reducing a possibility of the occurrence of damage, cracking or other failures because of the reinforcement plate.

12 Claims, 5 Drawing Sheets

5,590,965

LINEAR GUIDE APPARATUS LUBRICATED WITH LUBRICANT-CONTAINING POLYMER

BACKGROUND OF THE INVENTION

The present invention relates to a linear guide apparatus, more particularly, to a linear guide apparatus of a type that is lubricated with a lubricant-containing polymer in such a way that a plurality of rolling elements rolling within a slider are automatically supplied with the lubricant from a seal device over an extended time.

A conventional linear guide apparatus in common use is typically shown in FIG. 6 and includes an axially extending guide rail 1 having rolling grooves 3 in outer surfaces and a slider 2 mounted over the guide rail 1. The slider 2 includes a slider body 2A and an end cap 2B fitted at both ends of the slider body 2A. The slider body 2A has two wings 4, each of which has rolling grooves (not shown) in its inner lateral surface that are confronted with the rolling grooves 3 in the guide rail 1. The slider body 2A also has return paths (not shown) that are formed axially through the thick-walled portion of each wing 4 and along which the rolling elements are to be returned. End caps 2B have curved paths (not shown) that allow the rolling grooves 3 in the slider body 2A to communicate with the return paths which are parallel to the grooves 3, thereby forming circuits for the circulation of the rolling elements. The rolling elements which are typically in the form of steel balls are loaded in the circuits.

The slider 2 mounted over the guide rail 1 moves smoothly along the rail via the rolling elements rolling in both the opposed grooves. While the slider 2 moves, the rolling elements circulate endlessly along the circulation circuits in the slider 2.

The slider 2 is fitted with a dustproof seal device that closes the openings of the clearance from the guide rail 1 and which, as shown in FIG. 7, includes side seals 5 provided at both ends (or at the end face of each end cap 2B) and under seals 6 provided on the underside. Conventionally, these seals are made of rubbers such as NBR (acrylonitrile butadiene rubber).

In order to lubricate the above-described linear guide apparatus, a grease nipple 7 is fitted on the slider 2 and grease or some other lubricant is supplied through this nipple into the circuits for the circulation of the rolling elements, thereby lubricating the elements as they roll within the slider.

This linear guide apparatus lubricated directly with the grease or lubricant has involved a problem in that when it is used in a hot environment, the grease or lubricant packed in the slider becomes fluid and flows out of the slider; because of this early depletion of the lubricant, refilling work is necessary at short intervals. Another problem is associated with use in an environment containing much foreign matter as exemplified by wood waste, metal shavings and other powdery foreign objects; in this situation, the packed lubricant is deprived of the oil content by absorption into the foreign matter and there is high likelihood for the occurrence of poor lubrication.

With a view to solving these problems, a seal device including lubricant-containing polymer members has been proposed in Unexamined Japanese Patent Publication No. Hei. 6-346919. In the proposed device, the seal members such as side seals and under seals to be fitted on the slider are formed of a lubricant-containing rubber or synthetic resin such that the lubricant would seep out of the seal members continuously over an extended time to be supplied automatically to the circuits in the slider for the circulation of the rolling elements.

However, the linear guide apparatus equipped with this seal device including conventional lubricant-containing polymer members has involved the following problems.

(1) The seal members in the form of the lubricant-containing polymer member contains such a great amount of lubricant that it is considerably low in mechanical properties such as hardness and strength compared to seal members made of more conventional materials such as NBR and, therefore, if they are used as such, they are prone to break, crack or otherwise fail to perform the sealing function.

(2) Conventional side seals in common use include a rubber (e.g. NBR) member and a metallic reinforcement plate (core metal), which are bonded together with an adhesive to make an integral body. However, this approach is not equally applicable to the case of joining the lubricant-containing polymer member and the core metal since the high oil content of the polymer member not only presents difficulty in the bonding operation but also increases a possibility of separation between the two members.

(3) In order to fit protectors or reinforcing side seals on outer surfaces of the seal device, they have to be secured by threading screws into the lubricant-containing polymer member through mounting holes. However, the tightening of the screws can potentially deform, crack or otherwise damage the lubricant-containing polymer member which, as already mentioned, is low in physical properties such as hardness and strength.

As another problem, local pressure is exerted on the tightened areas, from which the lubricant seeps out to cause its early depletion.

SUMMARY OF THE INVENTION

The present invention has been accomplished under conventional circumstances and has as an object providing a long-lived linear guide apparatus of a type that is lubricated with a lubricant-containing polymer, in which a lubricant-containing polymer member is firmly secured to a core metal to fabricate a seal device, thereby reducing a possibility of the occurrence of damage, cracking or other failures during fitting or use of the seal device and which linear guide apparatus ensures that the lubricant is automatically supplied from the seal device to the rolling elements in the slider consistently over an extended period of time.

The object can be attained by a linear guide apparatus which provides: an axially extending guide rail having a first rolling groove on its outer surface; a slider fitted loosely to the guide rail and including a circulation passage which is formed of a second rolling groove confronted with the first rolling groove, a curved path formed at an end of the second rolling groove, a return path coupled to the second rolling groove through the curved path; a plurality of rolling elements loaded in the circulation passage to permit the slider to move relative to and along the guide rail; and a seal device fixed to the slider in slidable contact with the outer surface of the guide rail for sealing a clearance existing between the guide rail and the slider, the seal device including a reinforcement plate and a lubricant-containing polymer member, the reinforcement plate having a surface which is formed of a polyolefinic synthetic resin, the lubricant-containing polymer member being formed of a polyolefinic polymer and a lubricant, and joined to the surface of the reinforcement plate by one-piece molding.

In a preferred embodiment, a protector is brought into contact with outer surfaces of the seal device and fixed to the slider by mounting screws and intervening annular spacers.

In another preferred embodiment, a reinforcement side seal is brought into contact with outer surfaces of the seal device and fixed to the slider by mounting screws and intervening annular spacers in such a way that it is slidable along outer surfaces of the guide rail.

The reinforcement plate may solely be composed of a polyolefinic synthetic resin. Alternatively, it may be a core metal coated with a polyolefinic synthetic resin or a core metal having a polyolefinic synthetic resin bonded thereto.

The lubricant-containing polymer member may be a tube that is to be inserted into each of the holes that form return paths in the slider along which the rolling elements are to be returned, so that the polymer member serves both as the return paths and as the source of lubricant supply.

The annular spacers may be made of a synthetic resin or a metal.

The linear guide apparatus of the present invention is such that the lubricant exudes slowly out of the lubricant-containing polymer member of the seal device which is provided in the slider in such a way that it makes facial contact with the guide rail, so that the lubricant is supplied uniformly to the surfaces of the rolling elements via the guide rail. This allows the linear guide apparatus to be lubricated consistently over an extended time.

To join the reinforcement plate to the lubricant-containing polymer member, a plasticized material of the member is injected onto the polyolefinic synthetic resin formed on the reinforcement plate. This ensures the two members to be joined firmly since they are made of similar (i.e., polyolefinic plastic) materials.

The lubricant-containing polymer member of the seal device is compensated for its insufficient strength by the reinforcement plates and the mounting spacers; hence, there is no possibility for the seal device to break or crack even if the linear guide apparatus is operated for a prolonged time.

BRIEF DESCRIPTION OF THE DRAWINGS

FIGS. 4A, 4B and 4C are perspective views of each seal device for use on the linear guide apparatus, in which FIG. 4A is a seal device of a first embodiment, FIG. 4B is a seal device of a second embodiment and FIG. 4C is a seal device of a third embodiment according to the present invention;

DETAILED DESCRIPTION OF THE INVENTION

Figure 1:
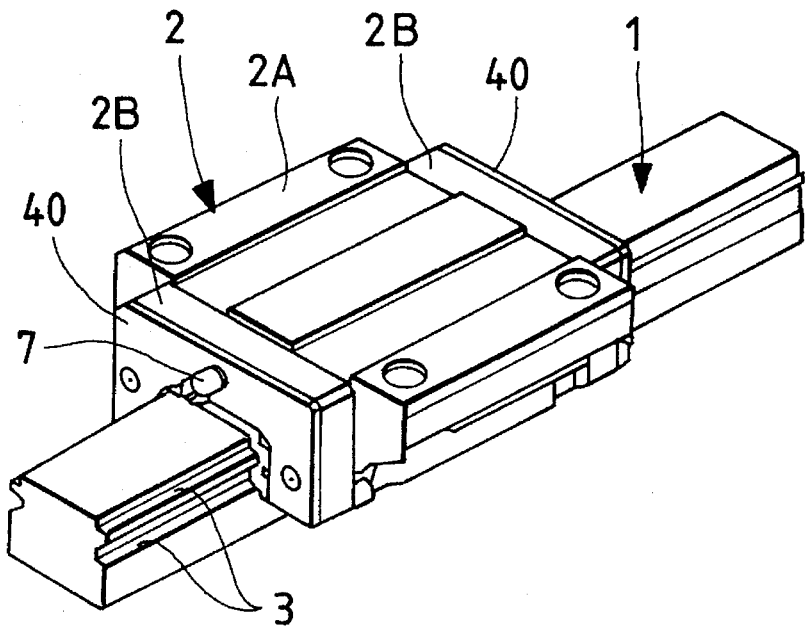
FIG. 1 is a perspective view showing a linear guide apparatus according to the present invention.

Seal devices of a linear guide apparatus according to the present invention will now be described by reference to accompanying drawings.

A lubricant-containing polymer member to be used in the linear guide apparatus of the present invention can be prepared by the following procedure: a polymer is selected from the group of polyolefinic polymers having essentially the same chemical structure, as exemplified by polyethylene, polypropylene, polybutylene and polymethylpentene; the polymer is mixed with a suitable lubricant selected from among paraffinic hydrocarbon oils (e.g., poly-$\alpha$-olefinic oil), naphthenic hydrocarbon oils, mineral oils, ether oils (e.g. dialkyldiphenyl ether oils), and ester oils (e.g. phthalic acid esters and trimellitic acid esters); the mixture is heated to melt; the melt is injected into a required mold and cooled to solidify under pressure. If desired, various additives such as oxidation inhibitors, rust preventives, antiwear agents, defoaming agents and extreme pressure agents may be added to the mixture of the polymer and the lubricant before it is heated to melt.

The lubricant-containing polymer member includes preferably 20–90 wt % of the polyolefinic polymer and 10–80 wt % of the lubricant. If the proportion of the polyolefinic polymer is less than 20 wt %, physical properties such as hardness and strength for providing the necessary sealing action cannot be attained. If the proportion of the polyolefinic polymer exceeds 90 wt % (i.e., the proportion of the lubricant is less than 10 wt %), the supply of the lubricant is insufficient to assure the intended lubrication of the linear guide apparatus.

The polymers mentioned above have essentially the same structure but differ in average molecular weight ranging from $1 \times 10^3$ to $5 \times 10^6$. Preferably, polymers having comparatively low average molecular weights of $1 \times 10^3$–$1 \times 10^6$ and those having super-high average molecular weights of $1 \times 10^{-6}$–$5 \times 10^6$ are used either independently or in admixture.

In order to improve the mechanical strength of the lubricant-containing polymer member, the polyolefinic polymers mentioned above can be mixed with suitable thermoplastic or thermosetting resins.

Exemplary thermoplastic resins include polyamides, polycarbonates, polybutylene terephthalate, polyphenylene sulfide, polyethersulfone, polyether etherketone, polyamideimide, polystyrenes and ABS resins. Exemplary thermosetting resins include unsaturated polyester resins, urea resins, melamine resins, phenolic resins, polyimide resins and epoxy resins. These thermoplastic and thermosetting resins can be used either independently or in admixture.

In order to ensure that the polyolefinic polymers and other resins mentioned above are dispersed in a highly uniform state, suitable compatibilizers may be added as required.

The reinforcement plate to be used in the linear guide apparatus of the present invention is either a core metal such as steel or aluminum that are coated with polyolefinic plastics or the same core metal having polyolefinic plastics bonded thereto such as by adhesives or a plate solely composed of polyolefinic plastics. Useful polyolefinic plastics include polyethylene, polypropylene and polymethyl pentene.

The annular spacers to be used in the seal device on the linear guide apparatus are made of metals such as steel and aluminum or plastics having sufficient strength such as PTFE (polytetrafluoroethylene), PPS (polyphenylene sulfide), PA (polyamide), POM (polyoxymethylene), PE (polyethylene) and PP (polypropylene).

To fabricate the seal device for use on the linear guide apparatus, the polyolefinic plastic surface of the reinforcement plate can be joined to the lubricant-containing polymer member by the following method. First, a mold is maintained at a suitable temperature and the reinforcement plate in the form of a core metal having a polyolefinic plastic surface is fixed in the mold cavity. Thereafter, a plasticized (molten) material of the lubricant-containing polymer member is injection-molded into the cavity and cooled to solidify in the shape of the cavity. As a result, the reinforcement plate and the lubricant-containing polymer member made of the polyolefinic polymer which is of the same kind as the polyolefinic plastic material in the reinforcement plate are consolidated easily and firmly to fabricate the seal device for use in the present invention. It should be noted here that if the reinforcement plate is formed of metals, nylons or any other materials dissimilar to the polyolefinic polymers, the plate would not be effectively joined to the lubricant-containing polymer member and delamination would readily occur.

Figure 5:
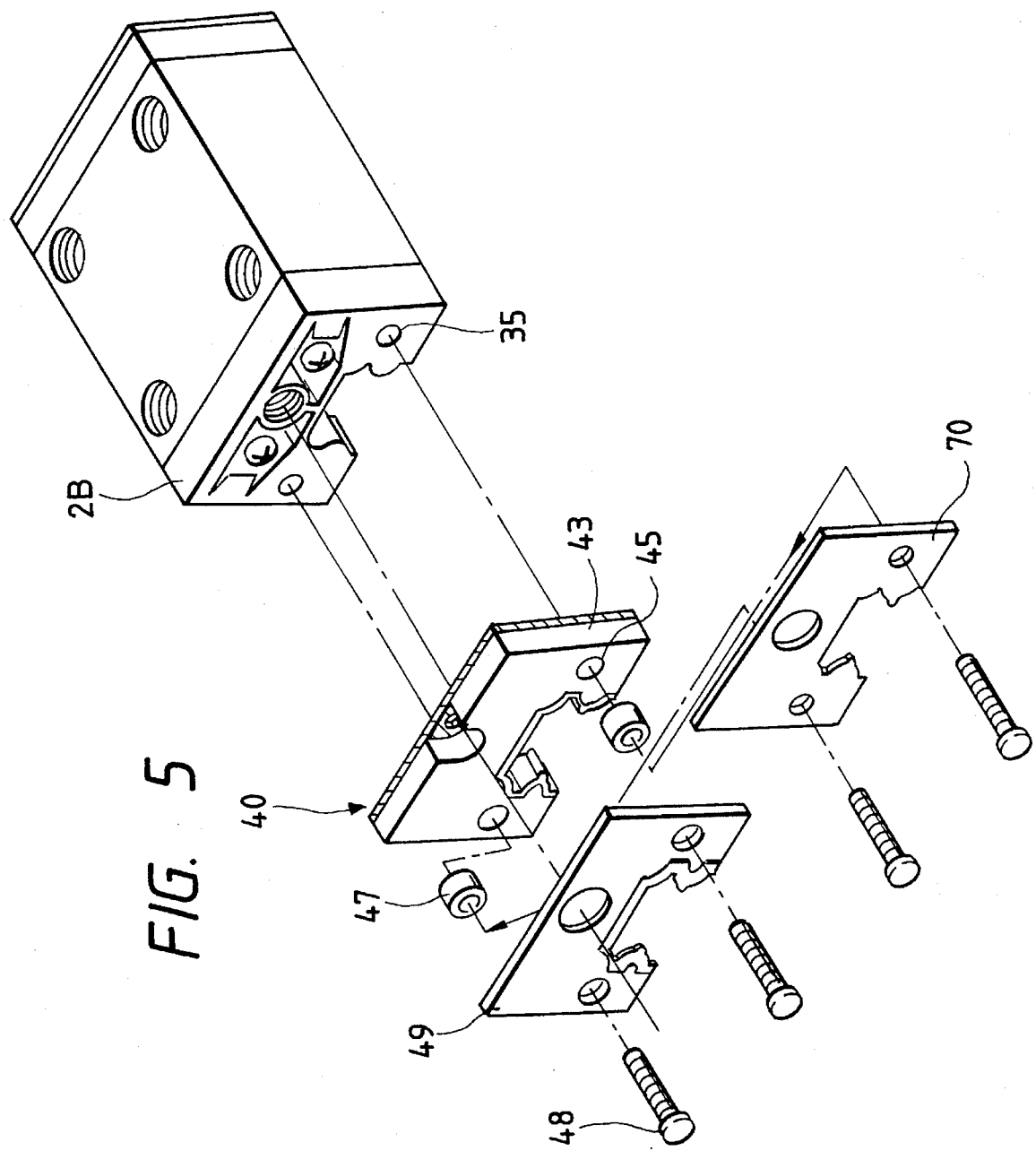
FIG. 5 is an exploded view of the linear guide apparatus for the case where a reinforcement side seal or a protector is used in combination with the seal device.
Figure 6:
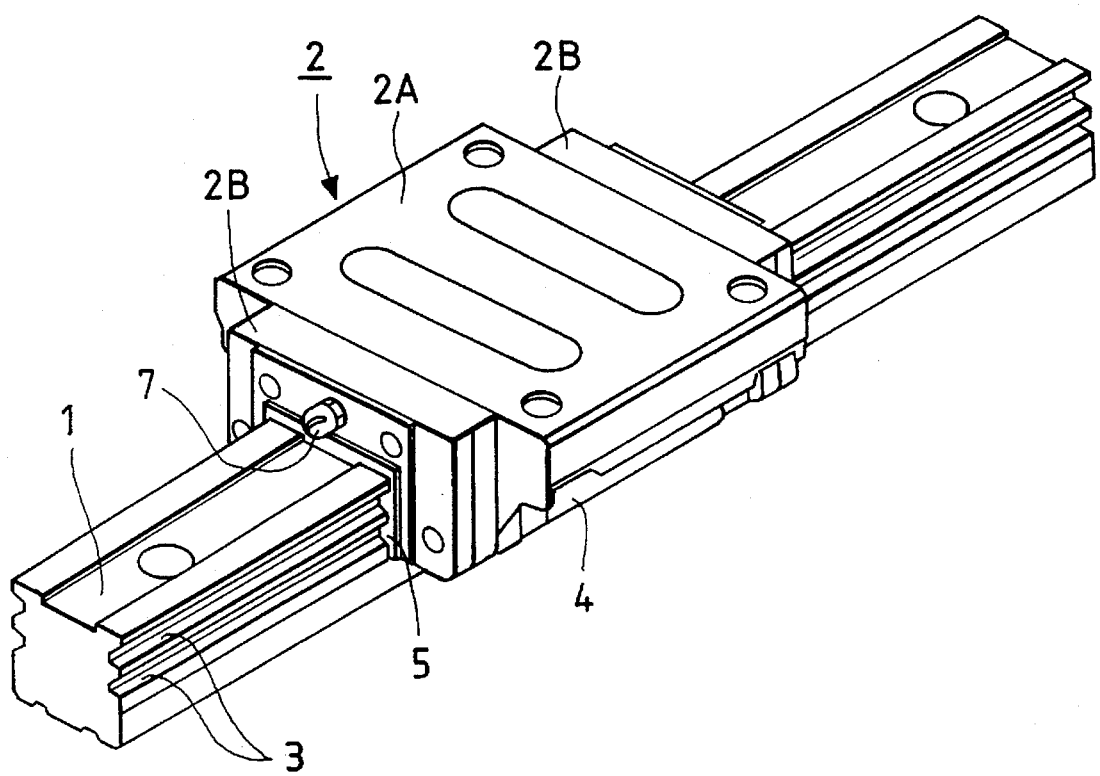
FIG. 6 is a perspective view of a conventional linear guide apparatus.
Figure 7:
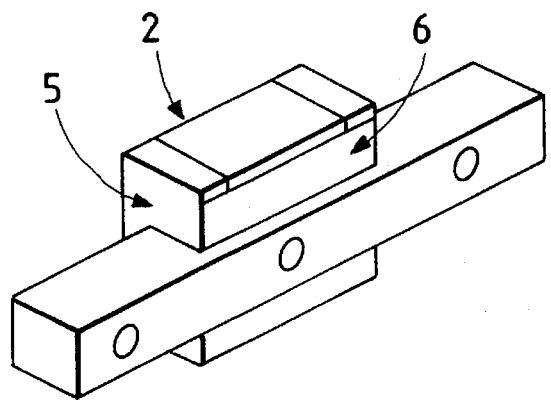
FIG. 7 is a perspective view showing the underside of the conventional linear guide apparatus.

A first embodiment of the present invention will now be described with reference to FIGS. 1–5, in which the parts or components that are the same as or equivalent to those of a conventional example shown in FIGS. 6 and 7 are identified by like numerals.

Figure 2:
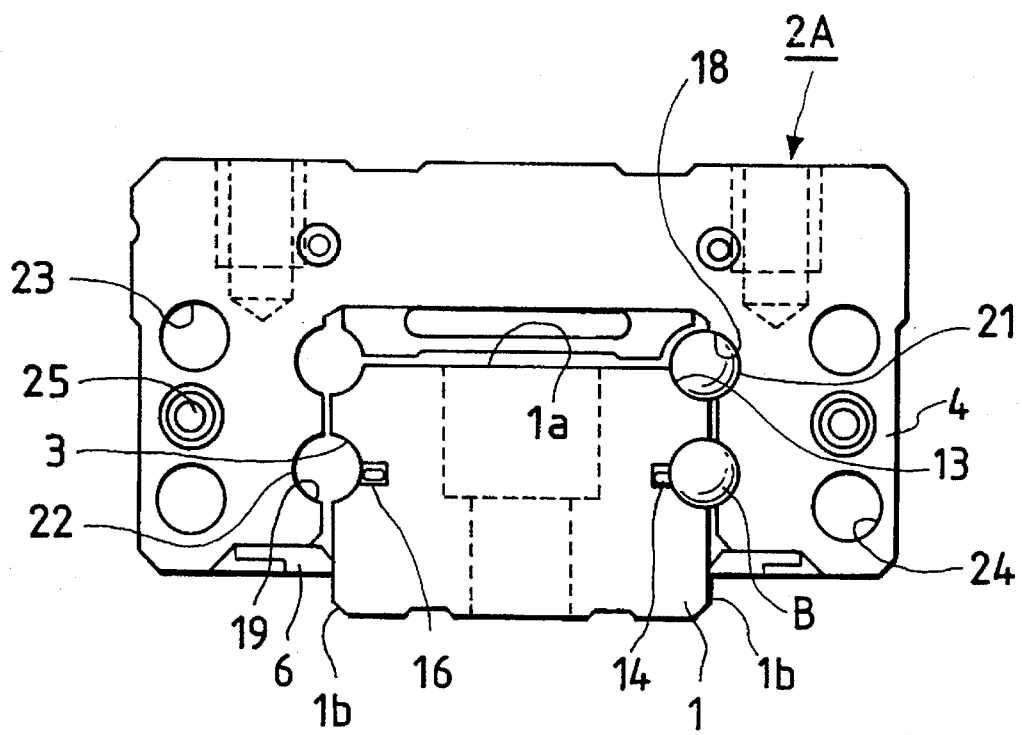
FIG. 2 is a front view of the linear guide apparatus with both end caps removed.

The overall structure of the linear guide apparatus of the present invention is first explained. As shown in FIGS. 1 and 2, the linear guide apparatus includes essentially a rectangular guide rail 1 and a slider 2 that has a generally U-shaped cross section and which is mounted over the guide rail 1 in such a manner that it is capable of axial relative movement. The slider 2 includes a body 2A and end caps 2B that are detachably fixed to axial opposite ends of the body 2A. In the first embodiment under consideration, a first pair of rolling grooves 13 are formed along the ridges of the guide rail 1 where its top surface 1a crosses both lateral sides 1b. These grooves extend axially and have a nearly quadrant cross section. A second pair of rolling grooves 3 having a nearly semicircular cross section are formed halfway the two lateral sides 1b of the guide rail 1. The bottom of each groove 3 is provided with a relief groove 16 in a retainer 14 that prevents rolling elements B from falling away when the slider 2 is not mounted over the guide rail 1.

The slider 2 has a first pair of loaded rolling grooves 18 formed at corners on inner surfaces of both wings 4 of the body 2A. The grooves 18 have a generally semicircular cross section and are confronted with the first pair of grooves 13 in the guide rail 1. The slider 2 also has a second pair of loaded rolling grooves 19 formed midway the inner lateral sides of the wings 4. The grooves 19 have a generally semicircular cross section and are confronted with the second pair of grooves 3 in the guide rail 1. The grooves 13 combine with the grooves 18 to make a first pair of loaded rolling paths 21 whereas the grooves 3 combine with the grooves 19 to make a second pair of loaded rolling paths 22.

The wings 4 of the slider body 2A have in their upper thick-walled part a first pair of return paths 23 along which the rolling elements are to be returned; these return paths extend axially parallel to the grooves 18 and are in the form through-holes having a circular cross section. The wings 4 also have a second pair of return paths 24 formed in their lower part along which the rolling elements are to be returned; these return paths also extend axially parallel to the grooves 3 and are in the form of through-holes having a circular cross section. Screw holes 25 are formed for fitting the end caps 2B by screws.

Figure 3:
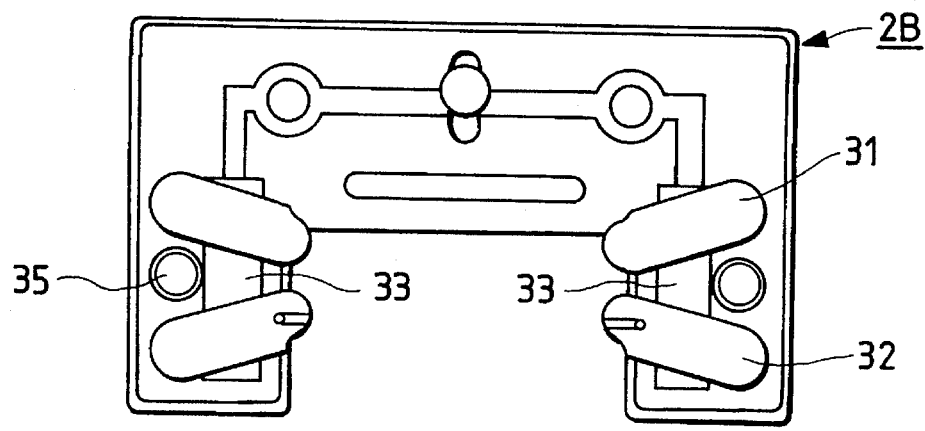
FIG. 3 is a rear view of one of the end caps on the linear guide apparatus.
Figure 4A:
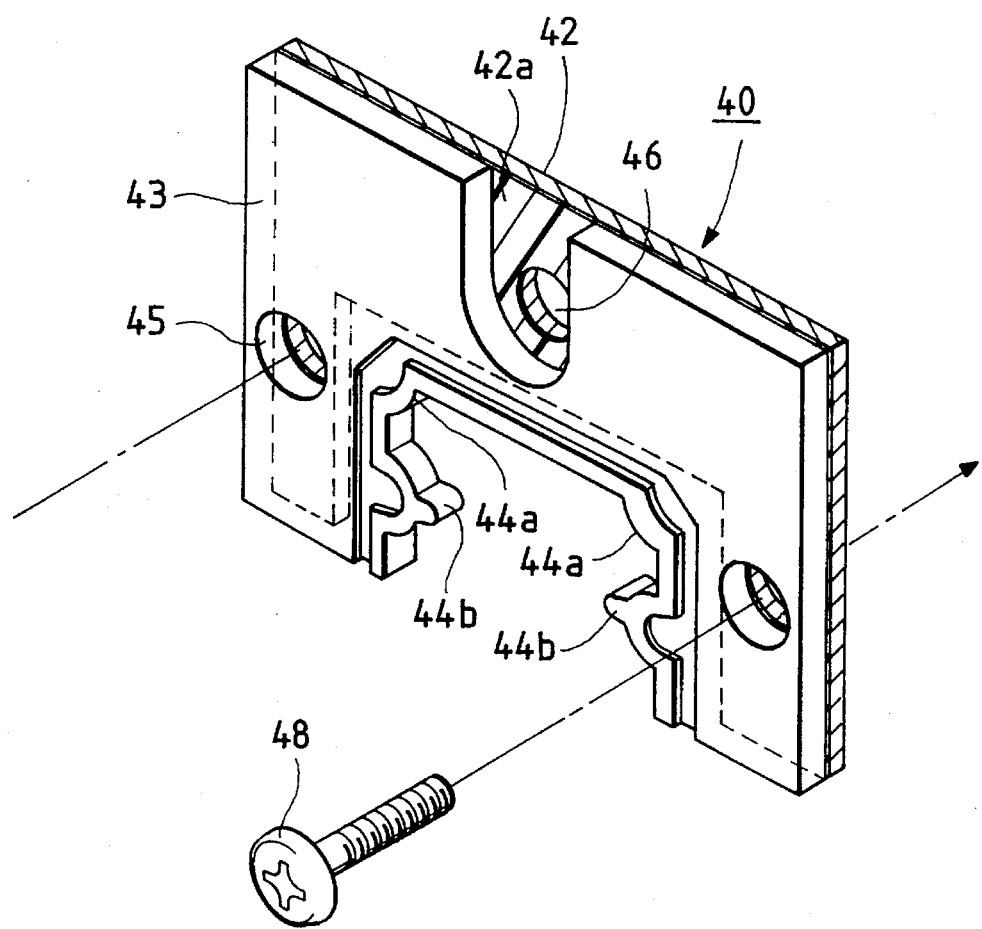
Figure 4B:
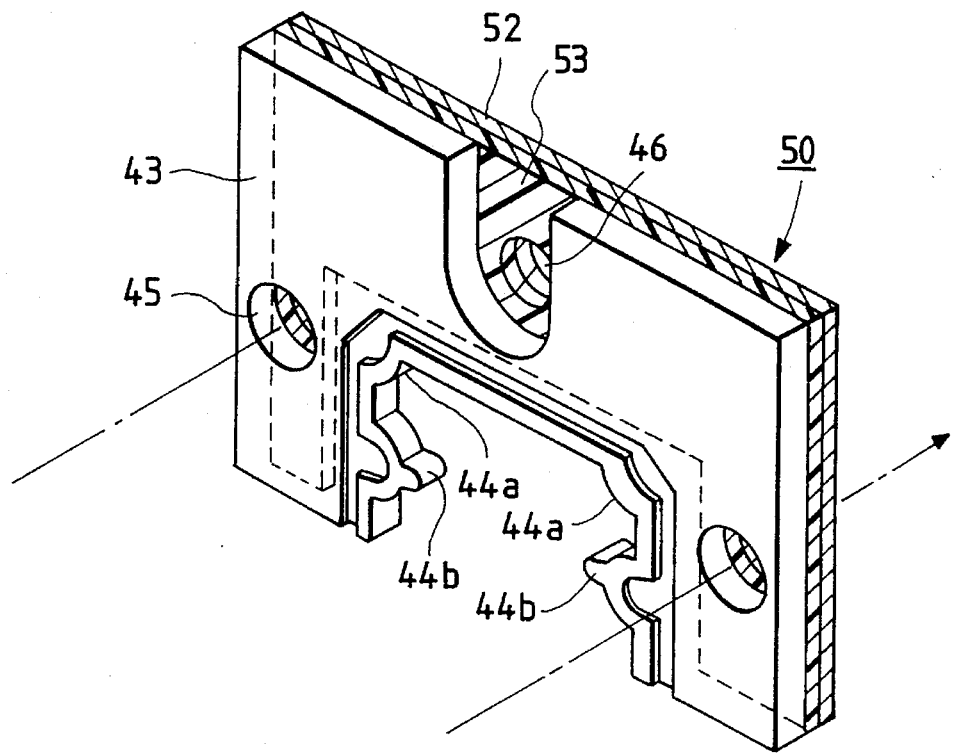
Figure 4C:
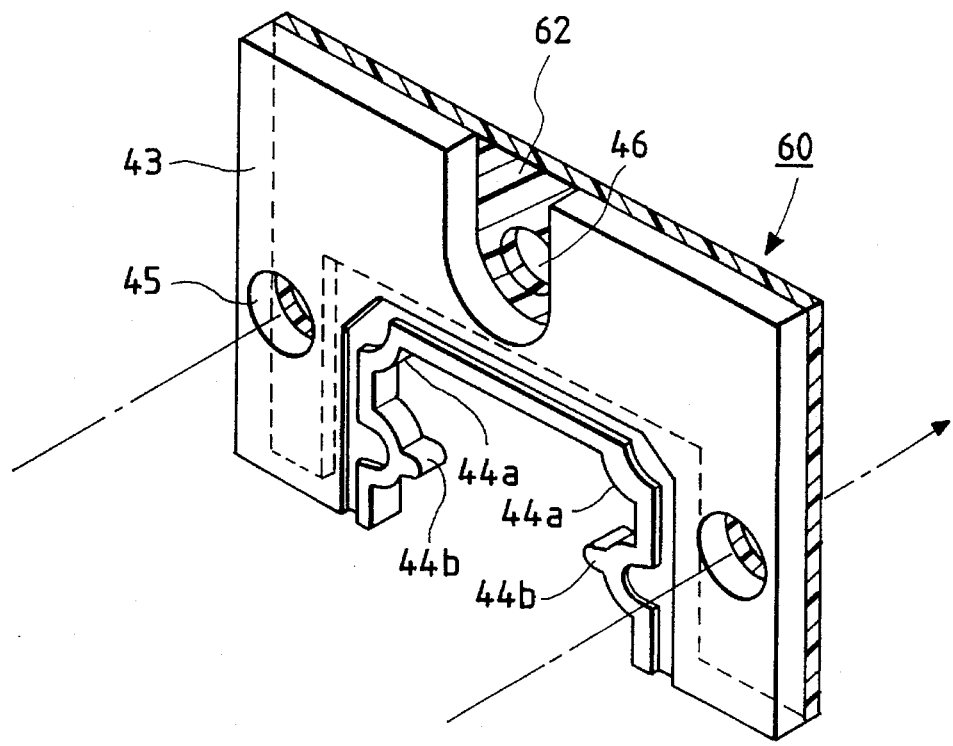

The end caps 2B are injection-molded from synthetic resins and have a generally U-shaped cross section. As shown in FIG. 3, the rear surface of each end cap 2B which is to be joined with the slider body 2A has an upper semicircular recess 31 and a lower semicircular recess 32 formed in both wings; the two recesses are inclined in opposite directions. The rear surface of each end cap 2B also has a semicylindrical groove 33 formed in each wing in such a way that it traverses the centers of recesses 31 and 32. A semicylindrical return guide (not shown) is fitted into each groove 33 to form an upper and a lower semiannular curved path in the rear surfaces of end caps 2B. The thus formed curved paths each have a circular cross section. When the end caps 2B having this construction are fitted to the slider body 2A, the semiannular curved paths permit the grooves 18 in the slider body to communicate with the upper return paths 23 while, at the same time, the grooves 19 communicate with the lower return paths 24.

The grooves 18 (or 19), the return paths 23 (or 24), and the curved paths at their ends provide circulation passages in which the rolling elements B are loaded in such a way that they can circulate endlessly along the circulation passages.

There is now described the seal device for sealing both side openings of clearances that exist between the slider 2 and the guide rail 1 of the linear guide apparatus to separate each other. The seal device in the first embodiment under discussion includes a side seal 40 (see FIG. 4A), which is a one-piece molding of a reinforcement plate 42 and a lubricant-containing polymer member 43. The reinforcement plate 42 includes a cold-rolled steel plate (SPCC) that is generally U-shaped to conform to the outer dimension of the end cap 2B and which is covered with a coating 42a of a polyolefinic synthetic resin (i.e., polyethylene). The lubricant-containing polymer 43 is joined to the outer surface of the reinforcement plate 42. To fabricate the lubricant-containing polymer member 43, a material that includes 21 wt % of a low-molecular weight polyethylene (PZ50U of Mitsubishi Petrochemical Co., Ltd.) and 9 wt % of a super-high molecular weight polyethylene (MIPERON XM220 of Mitsui Petrochemical Industries, Ltd.) and 70 wt % of a lubricant paraffinic mineral oil (FBK RO100 of Nippon Oil Co., Ltd.) is plasticized (molten) in an injection molding machine, from which it is injected into a specified mold, where it is cooled to solidify under pressure. Prior to this molding step, the reinforcement plate 42 is fixed in the cavity of the mold as it is held at a specified temperature; then, the plasticized mixture material for the lubricant-containing polymer member 43 is injection-molded into the mold cavity. Thus the polyethylene coating 42a on the reinforcement plate 42 is united with the polyethylene in the lubricant-containing polymer member 43 to insure that the two members are joined together to provide a strong bonding operation.

The thus formed side seal 40 is characterized in that the inner periphery of the generally U-shaped polymer member 43 extends inward of the inner periphery of the reinforcement plate 42 to make slidable contact with the top surface 1a and outer lateral sides 1b of the guide rail 1. The side seal 40 also has inward projections 44a and 44b of such shapes that they are in slidable contact with two grooves 3 and 13 which are formed on each lateral side of the guide rail 1. The major surface of the side seal 40 is provided with two holes 45 that assist in fitting the side seal to each end cap 2B and one hole 46 that assists in the fitting of a grease nipple.

As shown in FIG. 5, a reinforcement side seal 49 or a protector 70 may be fitted to an outer surface of the side seal 40; the reinforcement side seal 49 may be of a conventional type and the protector 70 may be a metal plate. To fit them, an annular spacer 47 is inserted into each of the holes 45. The reinforcement side seal 49 and the protector 70 serve to strengthen the side seal 40. The reinforcement side seal 49 includes a generally U-shaped metal plate and a rubber sealant fixed thereto in such a way that it extends inward of the inner periphery of the metal plate. Having this structure, the reinforcement side seal 49 also serves to close the openings at opposite ends of the clearance between the mating surfaces of the guide rail 1 and the slider 2, thereby ensuring against the entrance of dust or dirt particles from either end of the slider 2; thus, the reinforcement side seal 49 combines with the side seal 40 to provide a double seal.

The linear guide apparatus of the present invention operates in the following manner. For fitting the side seal 40, screws 48 are inserted through holes 45 and corresponding holes 35 of the end cap 2B to be threaded into holes 25 at each end face of the slider body 2A, so that the side seal 40 is secured to each end face of the slider 2 together with the end cap 2B. If the reinforcement side seal 49 or the protector 70 is to be used, the tightening allowance of the screws 48 is regulated by the annular spacers 47. This ensures against excessive tightening of the screws which would otherwise cause deformation or cracking in the lubricant-containing polymer member 43 or exert unwanted pressure on the tightened area to accelerate the oozing of the lubricant.

The seal lips of the side seal 40 contact the lateral sides 1b of the guide rail 1, the inner surfaces of the ball rolling grooves 3 and 13, and the top surface 1a of the guide rail.

Thus, the side seal 40 closes the openings at opposite ends of the clearance between the mating surfaces of the guide rail 1 and the slider 2 and ensures completely against the entrance of dust or dirt particles from either end of the slider 2. This dustproof action is enhanced by using the side seal 40 in combination with the reinforcement side seal 49 since the double seal effect is realized.

When the slider 2 moves over the guide rail 1 fixed on a machine, rolling elements B rolling within the loaded rolling path 21 (or 22) move in the same direction but at a slower speed until they reach one terminal curved path, where they make a U-turn and move along the return path 23 (or 24) in opposite direction; when the rolling elements B reach the other terminal curved path, they make another U-turn to go back to the same path 21 (or 22). This circulatory movement of rolling elements B is repeated endlessly.

If the linear guide apparatus of the present invention is driven in this way, the lubricant exudes slowly out of the lubricant-containing polymer member 43 of the side seal 40 to be supplied automatically to the rolling elements B as they roll within the grooves 3 and 13 in the guide rail 1. This self-lubricating action of the rolling elements ensures consistent and smooth operation of the linear guide apparatus over an extended period. As a result, the linear guide apparatus can be operated efficiently for a prolonged time under low frictional force even if the slider 2 is not frequently replenished with the lubricant.

If the side seal 40 is to be used, the grease nipple mounting hole may be closed with a blind plug; if desired, the plug may optionally be removed to provide an opening through which a lubricant such as grease can be supplied into the slider.

A second embodiment of the present invention will now be described. In the second embodiment, a side seal 50 has the same external shape as the side seal 40 shown in FIG. 4A and it differs from the first embodiment in the following two points: a reinforcement plate 52 includes an SPCC steel having a polyethylene plate 53 bonded thereto by a UV curable epoxy adhesive and the same lubricant-containing polymer member as in the first embodiment is joined to the reinforcement plate 52 by one-piece molding; and the annular spacers are made of a polyphenylene sulfide resin loaded with 20 wt % glass fibers. The operational features of the second embodiment of the side seal 50 and the advantages which it has are essentially the same as those described in the first embodiment.

A third embodiment of the present invention is described below. In the third embodiment, too, a side seal 60 has the same external shape as the side seal 40 of the first embodiment shown in FIG. 4A and it differs from the first embodiment in that a reinforcement plate 62 is formed of a super-high molecular weight polyethylene plate. The other structural aspects of the third embodiment of the side seal 60, its operational features and advantages are identical to those of the first and second embodiments.

It should be added that the linear guide apparatus to which the present invention is applicable is in no way limited to the type illustrated hereinabove and it may be of such a type that three or more loaded rolling grooves are formed on each lateral side of the slider or that the rolling elements are rollers rather than balls.

The reinforcement plate in the side seal device can achieve the purpose of the present invention if at least the surface of the plate to which the lubricant-containing polymer member is to be joined is made of a polyolefinic synthetic resin which is of a like kind to the synthetic resin in the polymer member. Accordingly, the other surface of the reinforcement plate may be made of any materials.

In the embodiments described above, two holes are made in the side seal device to assist in its fitting to the end caps on the slider body but this is not the sole case of the present invention and more than two such holes may be provided.

If desired, the annular spacers may be integral parts of the reinforcement plate.

Moreover, although the side seal is employed as a seal device in the above-described embodiments, an under seal including a reinforcement plate and a lubricant-containing polymer member in the same arrangement as the side seal can also be employed in the slider for sealing a clearance existing between an upper surface of the guide rail and an inner under surface of the slider. In such a case, the under seal can develop the same effect as the side seal.

As described above, the linear guide apparatus of the present invention is such that the seal device made of the lubricant-containing polymer member is provided in contact with the guide rail; because of this arrangement, the lubricant slowly exudes out of the polymer member to be automatically supplied to the surfaces of rolling elements via the guide rail while the elements roll, the lubricant is also supplied uniformly to every part of the loaded rolling paths which are to be contacted by the rolling elements. In addition, the seal device is formed of the reinforcement plate and the lubricant-containing polymer member, the reinforcement plate having at least one surface composed of a polyolefinic synthetic resin and the polymer member being composed of a polyolefinic polymer and a lubricant and joined to the synthetic resin surface of the reinforcement plate by one-piece molding; hence, the two members can be firmly fixed together. If the linear guide apparatus is to be fitted with a protector or a reinforcement side seal on outer surfaces of the seal devices, the protector or side seal reinforcement is placed in contact with the seal device and fixed thereto with annular spacers interposed and this ensures that the lubricant-containing polymer member can neither fail nor crack in spite of its low hardness and strength. As a result, the linear guide apparatus is effectively lubricated over an extended time and its service life is sufficiently prolonged for practical purposes.

What is claimed is:

1. A linear guide apparatus comprising:

an axially extending guide rail having a first rolling groove on its outer surface;

a slider fitted loosely to the guide rail and including a circulation passage which is formed of a second rolling groove confronted with the first rolling groove, a curved path formed at an end of the second rolling groove, a return path coupled to the second rolling groove through the curved path;

a plurality of rolling elements loaded in the circulation passage to permit the slider to move relative to and along the guide rail; and a seal device fixed to the slider in slidable contact with the outer surface of the guide rail for sealing a clearance existing between the guide rail and the slider, the seal device including a reinforcement plate and a lubricant-containing polymer member, the reinforcement plate having a first surface fixed to the slider and a second surface which is formed of polyolefinic synthetic resin, the lubricant-containing polymer member being formed of a polyolefinic polymer and a lubricant, and joined to the second surface of the reinforcement plate by one-piece molding.

2. The linear guide apparatus of claim 1, wherein the seal device includes an intervening annular spacer and a protector which contacts an outer surface of the lubricant-containing polymer member through the intervening annular spacer.

3. The linear guide apparatus of claim 2, wherein the intervening annular spacer comprises 20 wt % of glass fibers with the balance of resin selected from the group consisting of polytetrafluoroethylene, polyphenylene sulfide, polyamide, polyoxymethylene, PE polyethylene and polypropylene.

4. The linear guide apparatus of claim 1, wherein the reinforcement plate comprises a core metal which includes a coating to cover the second surface with the polyolefinic synthetic resin.

5. The linear guide apparatus of claim 1, wherein the reinforcement plate comprises a core metal and a resin plate bonded to the core metal and molded out of the polyolefinic synthetic resin.

6. The linear guide apparatus of claim 1, wherein the reinforcement plate comprises a molded article out of the polyolefinic synthetic resin.

7. The linear guide apparatus of claim 1, wherein the seal device includes an intervening annular spacer and a reinforcement side seal which contacts an outer surface of the lubricant-containing polymer member through the intervening annular spacer.

8. The linear guide apparatus of claim 7, wherein the intervening annular spacer comprises 20 wt % of glass fibers with the balance of resin selected from the group consisting of polytetrafluoroethylene, polyphenylene sulfide, polyamide, polyoxymethylene, PE polyethylene and polypropylene.

9. The linear guide apparatus of claim 1, wherein the lubricant-containing polymer member includes 20 to 90 wt % of polyolefinic polymer selected from the group consisting of polyethylene, polypropylene, polybutylene and polymethylpentane, and 10 to 80 wt % of a lubricant selected from the group consisting of paraffinic hydrocarbon oil, naphthenic hydrocarbon oil, mineral oil, ether oil and ester oil.

10. The linear guide apparatus of claim 9, wherein the polyolefinic polymer includes thermoplastic resin selected from the group consisting of polyamide, polycarbonate, polybutylene terephthalate, polyphenylene sulfide, polyether sulfone, polyether etherketone, polyamideimide, polystyrene and ABS resin.

11. The linear guide apparatus of claim 9, wherein the polyolefinic polymer includes thermosetting resin selected from the group consisting of unsaturated polyester resin, urea resin, melamine resin, phenolic resin, polyimide resin and epoxy resin.

12. The linear guide apparatus of claim 1, wherein the lubricant contained in the lubricant-containing polymer member gradually exudes therefrom for supplying the lubricant automatically to the rolling elements, the first rolling groove, the second rolling groove, the return path and the curved path.

* * * * *